(12) United States Patent
Strecker et al.

(10) Patent No.: US 11,820,370 B2
(45) Date of Patent: Nov. 21, 2023

(54) METHOD AND APPARATUS FOR LANE CONTROL OF A VEHICLE

(71) Applicant: Dr. Ing. h.c. F. Porsche Aktiengesellschaft, Stuttgart (DE)

(72) Inventors: Florian Strecker, Weissach (DE); Georg Warth, Bruchsal (DE); Georg von Tardy-Tuch, Unterreichenbach-Kapfenhardt (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 2 days.

(21) Appl. No.: 17/683,649

(22) Filed: Mar. 1, 2022

(65) Prior Publication Data
US 2022/0281523 A1 Sep. 8, 2022

(30) Foreign Application Priority Data
Mar. 4, 2021 (DE) .................... 10 2021 105 174.6

(51) Int. Cl.
*B60W 30/12* (2020.01)
*B60W 40/10* (2012.01)
(Continued)

(52) U.S. Cl.
CPC ............ *B60W 30/12* (2013.01); *B60W 10/20* (2013.01); *B60W 40/10* (2013.01); *B62D 6/002* (2013.01);
(Continued)

(58) Field of Classification Search
None
See application file for complete search history.

(56) References Cited

U.S. PATENT DOCUMENTS 5,122,957 A * 6/1992 Hattori ................ G05D 1/0246
701/28
5,299,130 A * 3/1994 Ono ..................... G05D 1/0282
701/25

(Continued)

FOREIGN PATENT DOCUMENTS

BR 102019015701 A2 * 5/2020 ............ B60W 10/04
CA 2890532 A1 * 5/2014 ............ B60K 28/06

(Continued)

OTHER PUBLICATIONS

German Search Report dated Oct. 26, 2021.

*Primary Examiner* — Kevin R Steckbauer
(74) *Attorney, Agent, or Firm* — Gerald E. Hespos; Michael J. Porco

(57) ABSTRACT

Apparatus for controlling dynamics of a vehicle determines a current course angle ($\alpha$) of the vehicle. A desired course angle ($\alpha_{psi}$) is defined and assigned to a first point on a temporal profile of a desired driving line. The first point is on the desired driving line at a first preview time from a location assigned to an instantaneous vehicle position. A course angle deviation of the current course angle ($\alpha$) from the desired course angle ($\alpha_{psi}$) is determined. A target angle ($\alpha_{ta}$) is defined and assigned to a second point on the temporal profile of the desired driving line. The second point is on the desired driving line at a distance of a second preview time from the location. A steering wheel angle ($\delta$) is determined as a total of the target angle ($\alpha_{ta}$) reinforced with a first parameter and the course angle deviation reinforced with a second parameter.

8 Claims, 4 Drawing Sheets

(51) Int. Cl.
    *B62D 15/02* (2006.01)
    *B62D 6/00* (2006.01)
    *B60W 10/20* (2006.01)
    *G08G 1/16* (2006.01)

(52) U.S. Cl.
    CPC ......... *B62D 15/021* (2013.01); *B62D 15/025* (2013.01); *G08G 1/167* (2013.01); *B60T 2201/08* (2013.01); *B60T 2201/087* (2013.01); *B60W 2540/18* (2013.01)

(56) References Cited

U.S. PATENT DOCUMENTS

| | | | | |
|---|---|---|---|---|
| 5,528,888 | A * | 6/1996 | Miyamoto | G05D 1/0278 701/50 |
| 8,209,091 | B2 * | 6/2012 | Morichika | B61B 10/04 701/41 |
| 8,706,353 | B2 * | 4/2014 | Kawai | B62D 15/025 701/41 |
| 8,744,685 | B2 * | 6/2014 | Nakano | B62D 15/025 701/41 |
| 8,825,300 | B2 * | 9/2014 | Tatsukawa | B62D 15/025 701/41 |
| 9,211,911 | B2 * | 12/2015 | Stählin | B62D 15/0265 |
| 9,440,675 | B2 * | 9/2016 | Tsubaki | B62D 5/0472 |
| 9,499,193 | B2 * | 11/2016 | Kageyama | B62D 5/046 |
| 9,625,910 | B2 * | 4/2017 | Choi | B60W 40/114 |
| 9,669,869 | B2 * | 6/2017 | Kageyama | B62D 5/00 |
| 10,156,846 | B2 * | 12/2018 | Choi | B62D 15/0255 |
| 10,829,149 | B1 * | 11/2020 | Garimella | G05D 1/0212 |
| 10,875,575 | B2 * | 12/2020 | Kunihiro | G01L 5/221 |
| 10,909,855 | B2 * | 2/2021 | Ide | B62D 15/025 |
| 11,242,056 | B2 * | 2/2022 | Han | B60W 30/09 |
| 11,519,156 | B2 * | 12/2022 | Veasy | B62D 1/12 |
| 2010/0100267 | A1 * | 4/2010 | Morichika | B62D 1/265 701/23 |
| 2013/0190982 | A1 * | 7/2013 | Nakano | B62D 15/025 701/41 |
| 2013/0190983 | A1 * | 7/2013 | Tatsukawa | B62D 15/025 701/41 |
| 2013/0190984 | A1 * | 7/2013 | Kawai | B62D 6/00 701/41 |
| 2013/0245890 | A1 * | 9/2013 | Kageyama | B62D 5/001 701/41 |
| 2014/0008141 | A1 * | 1/2014 | Kageyama | B60G 3/20 180/400 |
| 2015/0355641 | A1 * | 12/2015 | Choi | B60W 40/114 701/23 |
| 2016/0016606 | A1 * | 1/2016 | Tsubaki | B62D 5/0463 701/41 |
| 2018/0086344 | A1 * | 3/2018 | Zhu | B60W 50/0097 |
| 2019/0092330 | A1 * | 3/2019 | Ide | B60W 30/165 |
| 2019/0096258 | A1 * | 3/2019 | Ide | B62D 15/025 |
| 2020/0047772 | A1 * | 2/2020 | Yasue | B60W 30/12 |
| 2020/0055544 | A1 * | 2/2020 | Veasy | E02F 9/2004 |
| 2020/0056348 | A1 * | 2/2020 | Veasy | B62D 6/007 |
| 2020/0180609 | A1 * | 6/2020 | Dieckmann | B60W 50/14 |
| 2020/0307612 | A1 * | 10/2020 | Nakamura | B60W 40/072 |
| 2021/0107565 | A1 * | 4/2021 | Biro | B62D 13/00 |
| 2021/0403008 | A1 * | 12/2021 | Grossman | G06T 7/246 |
| 2022/0089161 | A1 * | 3/2022 | Takebayashi | B60W 60/001 |
| 2022/0114416 | A1 * | 4/2022 | Brosowsky | G06N 3/08 |
| 2022/0221558 | A1 * | 7/2022 | Gipson | H03M 7/6011 |
| 2022/0281523 | A1 * | 9/2022 | Strecker | B60W 40/10 |

FOREIGN PATENT DOCUMENTS

| | | | | |
|---|---|---|---|---|
| CN | 108082185 B | * | 1/2021 | ............ B60W 10/20 |
| CN | 112158201 A | * | 1/2021 | ...... B60W 30/18163 |
| CN | 112959994 B | * | 7/2021 | |
| CN | 112158201 B | * | 8/2021 | ...... B60W 30/18163 |
| CN | 113276833 A | * | 8/2021 | ............ B60W 30/02 |
| CN | 115027465 A | * | 9/2022 | ............ B60W 40/10 |
| DE | 10312513 A1 | * | 9/2004 | ........... B62D 15/025 |
| DE | 10312513 B4 | * | 9/2008 | ........... B62D 15/025 |
| DE | 102018123542 A1 | * | 3/2019 | ............ B60W 30/08 |
| DE | 102013100446 B4 | * | 1/2020 | ........... B62D 15/025 |
| DE | 102020108487 A1 | * | 10/2020 | ............ B60W 30/12 |
| DE | 102021105174 B3 | * | 3/2022 | ............ B60W 40/10 |
| JP | 2004199286 A | * | 7/2004 | |
| JP | 3599144 B2 | * | 12/2004 | ........... B62D 15/025 |
| JP | 2004352120 A | * | 12/2004 | |
| JP | 2005014775 A | * | 1/2005 | ......... B62D 15/0285 |
| JP | 2005014778 A | * | 1/2005 | ............... B60R 1/00 |
| JP | 3687252 B2 | * | 8/2005 | ............. B62D 1/286 |
| JP | 3706669 B2 | * | 10/2005 | |
| JP | 3725455 B2 | * | 12/2005 | |
| JP | 3911492 B2 | * | 5/2007 | ......... B62D 15/0285 |
| JP | 4145644 B2 | * | 9/2008 | |
| JP | 4291625 B2 | * | 7/2009 | |
| JP | 2020026154 A | * | 2/2020 | ............ B60W 10/04 |
| WO | WO-2004083014 A1 | * | 9/2004 | ........... B62D 15/025 |

\* cited by examiner

METHOD AND APPARATUS FOR LANE CONTROL OF A VEHICLE

CROSS REFERENCE TO RELATED APPLICATION

This application claims priority under 35 USC 119 to German Patent Appl. No. 10 2021 105 174.6 filed on Mar. 4, 2021, the entire disclosure of which is incorporated herein by reference.

BACKGROUND

Field of the Invention The invention relates to a method and to an apparatus for lane control of a vehicle.

Related Art Lane controllers determine a steering angle of a vehicle so that the vehicle follows a desired driving line.

SUMMARY OF THE INVENTION

A method and apparatus are provided to make a robust lane control possible while permitting adjustment in a particularly simple manner.

A lane controller in accordance with an embodiment the invention controls lateral dynamics of a vehicle and comprises a detection device, an output device and a computing device. The detection device of one embodiment is configured to detect or to determine a current course angle of the vehicle, the output device of one embodiment is configured to output a steering wheel angle with which the vehicle is controllable, and the computing device of one embodiment is configured to define a desired course angle that is assigned to a first point on a temporal profile of a desired driving line. The first point may be arranged on the desired driving line at a distance of a first preview time from a location assigned to an instantaneous vehicle position. The computing device may be configured to determine a course angle deviation of the current course angle from the desired course angle and to define a target angle that is assigned to a second point on the temporal profile of the desired driving line. The second point is arranged on the desired driving line at a distance of a second preview time from the location. The computing device of some embodiments is configured to determine the steering wheel angle in accordance with a sum total of the target angle reinforced with a first parameter and of the course angle deviation reinforced with a second parameter. This controller can be parameterized in a particularly simple manner with two proportional components.

The computing device of one embodiment is configured to define the first preview time and to determine the first point on the desired driving line. The first point of this embodiment is at a distance of the first preview time from the location. The computing device of this embodiment also may be configured to define the second preview time, and to determine the second point on the desired driving line. The second point of this embodiment is at a distance of the second preview time from the location. As a result, knowledge that a driver has about a vehicle performance can be simulated by means of simple parameterization and therefore time lags due to the vehicle behavior can be compensated for.

The computing device may be configured to determine a direction from a point with a fixed geometrical reference with respect to the vehicle, in particular from a center of gravity or front axle center point of the vehicle or from a driver's position in accordance with a model of the vehicle to the second point, and to determine the target angle in accordance with an angle by which the direction deviates from a vehicle longitudinal axis in accordance with the model of the vehicle.

The lane controller of some embodiments comprises an input device for inputting the first parameter and/or the second parameter and/or the first preview time and/or the second preview time. This makes it possible to parameterize the controller in a particularly simple manner.

The method for controlling the dynamics of a vehicle, in particular the lateral dynamics, provides in some embodiments that a current course angle of the vehicle is detected or determined. A desired course angle then may be defined and assigned to a first point on a temporal profile of a desired driving line. The first point may be on the desired driving line at a distance of a first preview time from a location that may be assigned to an instantaneous vehicle position. A course angle deviation of the current course angle from the desired course angle then may be determined. A target angle then is defined and is assigned to a second point on the temporal profile of the desired driving line. The second point may be on the desired driving line at a distance of a second preview time from the location. A steering wheel angle is determined in accordance with a sum total of the target value reinforced with a first parameter and of the course angle deviation reinforced with a second parameter. The vehicle can be controlled by outputting the steering wheel angle, for example, to a downstream controller or a steering actuator with which the vehicle is controlled.

In one aspect, the first preview time is defined and the first point on the desired driving line is determined. The first point is arranged at a distance of the first preview time from the location. The second preview time may be defined and the second point on the desired driving line may be determined. The second point is arranged at a distance of the second preview time from the location.

A direction from a point with a fixed geometrical reference with respect to the vehicle, in particular from a center of gravity or front axle center point of the vehicle or from a driver's position may be determined in accordance with a model of the vehicle to the second point. The target angle may be determined in accordance with an angle by which the direction deviates from a vehicle longitudinal axis in accordance with the model of the vehicle.

For the parameterization, an input can be identified, and the first parameter and/or the second parameter and/or the first preview time and/or the second preview time can be determined in accordance with the input.

Further advantageous embodiments emerge from the description below and the drawings.

DETAILED DESCRIPTION

Figure 1:
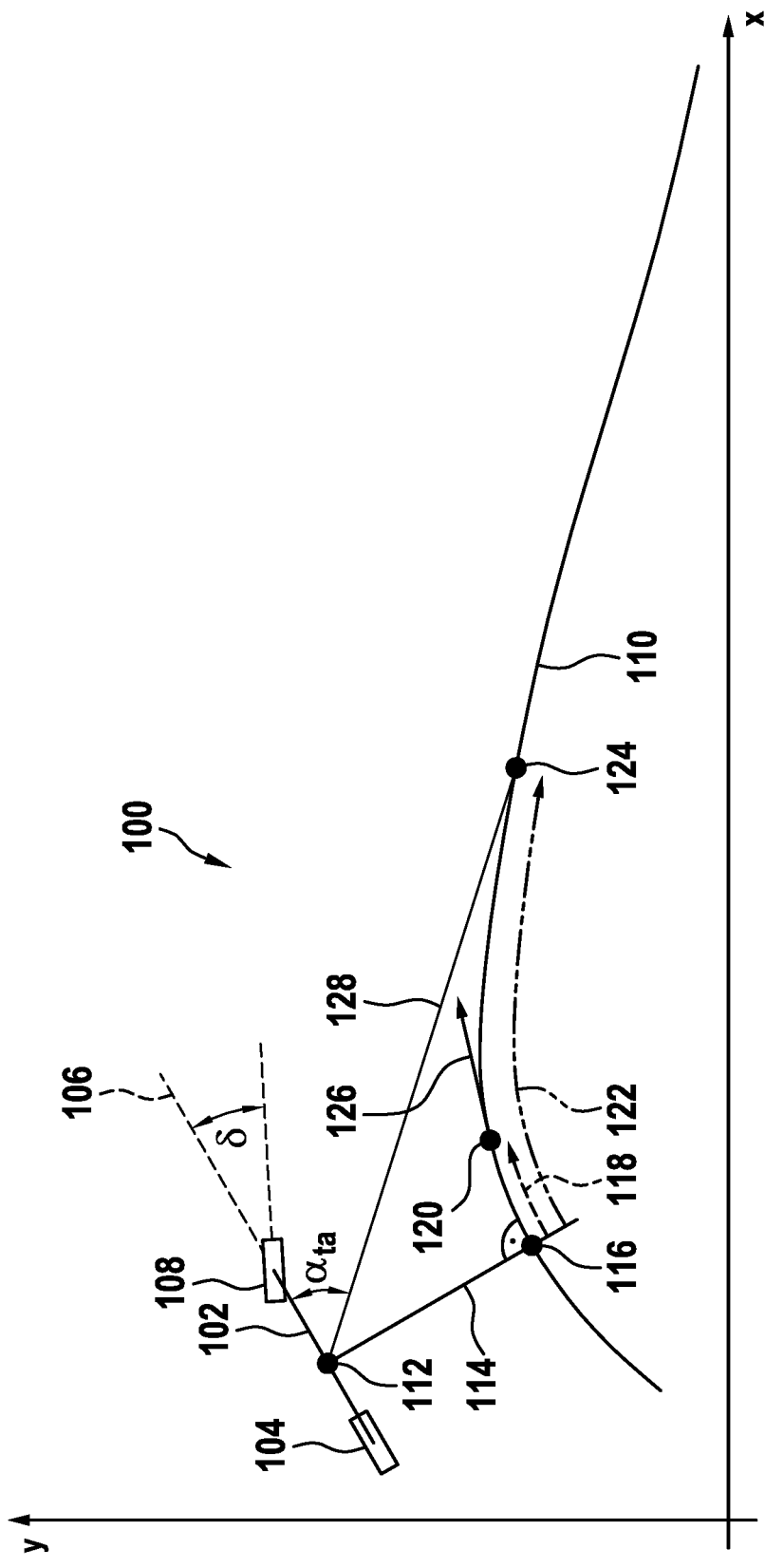
FIG. 1 is a diagrammatic illustration of controller variables.

FIG. 1 illustrates control variables of a lane controller in a model 100 using the example of a single track model 102 of a vehicle. The single track model 102 has a first wheel 104 and a second wheel 108. The second wheel 108 is steerable by a steering angle δ with respect to a vehicle longitudinal axis 106. A desired driving line 110 is defined for the vehicle 102. A different model of the vehicle may also be used.

In the example, a center of gravity 112 of the vehicle in the single track model 102 is arranged with respect to the desired driving line 110 on the vehicle longitudinal axis 106 between the wheels and offset from the desired driving line 110 by a distance 114. A perpendicular to the desired driving line 110 leads through a location 116 on the desired driving line 110, with the location 116 being assignable to an instantaneous position of the vehicle, and through the center of gravity 112. The distance 114 defines a transverse deviation of the vehicle from the desired driving line 110.

FIG. 1 shows a first preview period 118 for a desired course angle $\alpha_{psi}$ at a first point 120, and a second preview period 122 for a target angle $\alpha_{ta}$ at a second point 124, on the desired driving line 110. In FIG. 1, the second point 124 is farther from the location 116 in a direction of travel of the vehicle 102 than the first point 120. However, the second point 124 does not have to be farther from the location 116 than the first point 120. The preview periods can be selected as desired, and thus the first point 120 and the second point 124 do not have to be arranged in a fixed sequence on the desired driving line 110. The first point 120 and the second point 124 may lie one above the other. The first point 120 can be farther from the location 116 than the second point 124.

A first preview time $T_{PreviewYaw}$ specifies a duration of the first preview period 118. By way of example, FIG. 1 illustrates a course 126, i.e. a desired orientation of the vehicle longitudinal axis 106, at the first point 120 as a tangent to the desired driving line 110 at the first point 120. A second preview time $T_{PreviewXY}$ specifies a duration of the second preview period 122. A viewing direction 128 of a driver of the vehicle to a target point on the desired driving line 110 is illustrated in FIG. 1 by way of example as the section from the center of gravity 112 to the second point 124.

The two separate preview times $T_{PreviewYaw}$ and $T_{PreviewXY}$ facilitates a simulation of a reaction time of the vehicle, the viewing direction of a human driver and the knowledge of the human driver about a vehicle performance.

In the example, the points of the desired driving line 110 are defined in the form of a table of values. In the table of values, the following is assigned to a point on the desired driving line 110:

Distance from the location 116 of the vehicle along the desired driving line 110,
course angle α,
x-coordinate of the point,
y-coordinate of the point.

In the example described and illustrated herein, the control by the lane controller is parameterized and influenced by the following four parameters:

first preview time $T_{PreviewXY}$
first P component $P_{ta}$,
second preview time $T_{PreviewYaw}$,
second P component $P_{psi}$.

Figure 2A:
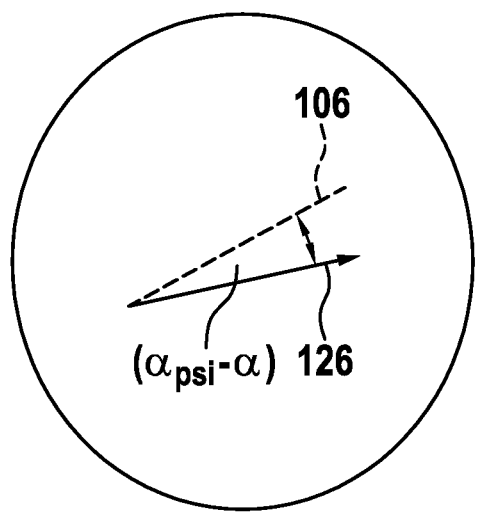
FIG. 2a is a diagrammatic illustration of a course angle deviation.

For the course angle α and the desired course angle $\alpha_{psi}$, FIG. 2a diagrammatically illustrates a course angle deviation ($\alpha_{psi}$−a) between the vehicle longitudinal axis 106 and the course 126.

Figure 2B:
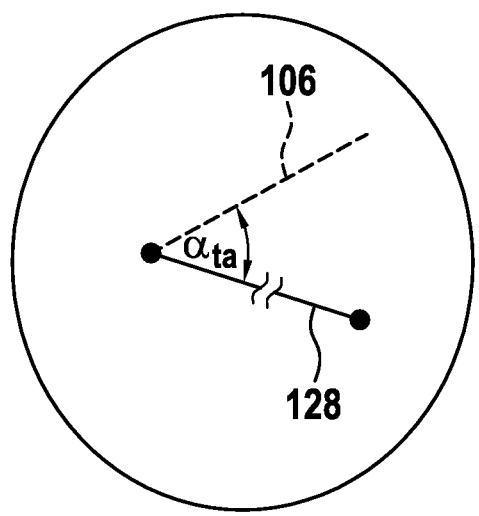
FIG. 2b is a diagrammatic illustration of a target angle deviation.

FIG. 2b diagrammatically illustrates the target angle deviation $\alpha_{ta}$ between the vehicle longitudinal axis 106 and the viewing direction 128.

The steering wheel angle δ required for maintaining the desired driving line 110 is then defined by the lane controller as follows:

$$\delta = \alpha_{ta}*P_{ta} + (\alpha_{psi}(T_{PreviewYaw}) - \alpha)*P_{psi}$$

This lane controller is usable for lane control, i.e. lateral control, in vehicle simulation models or in circuit simulations. This lateral control on the vehicle also may be used within the scope of a prototypical implementation.

It is advantageous that only P controllers are required for the lateral control. Owing to a corresponding performance of the vehicle, the control quality is nevertheless high. This lane control functions even in vehicle movement dynamics situations.

Figure 3:
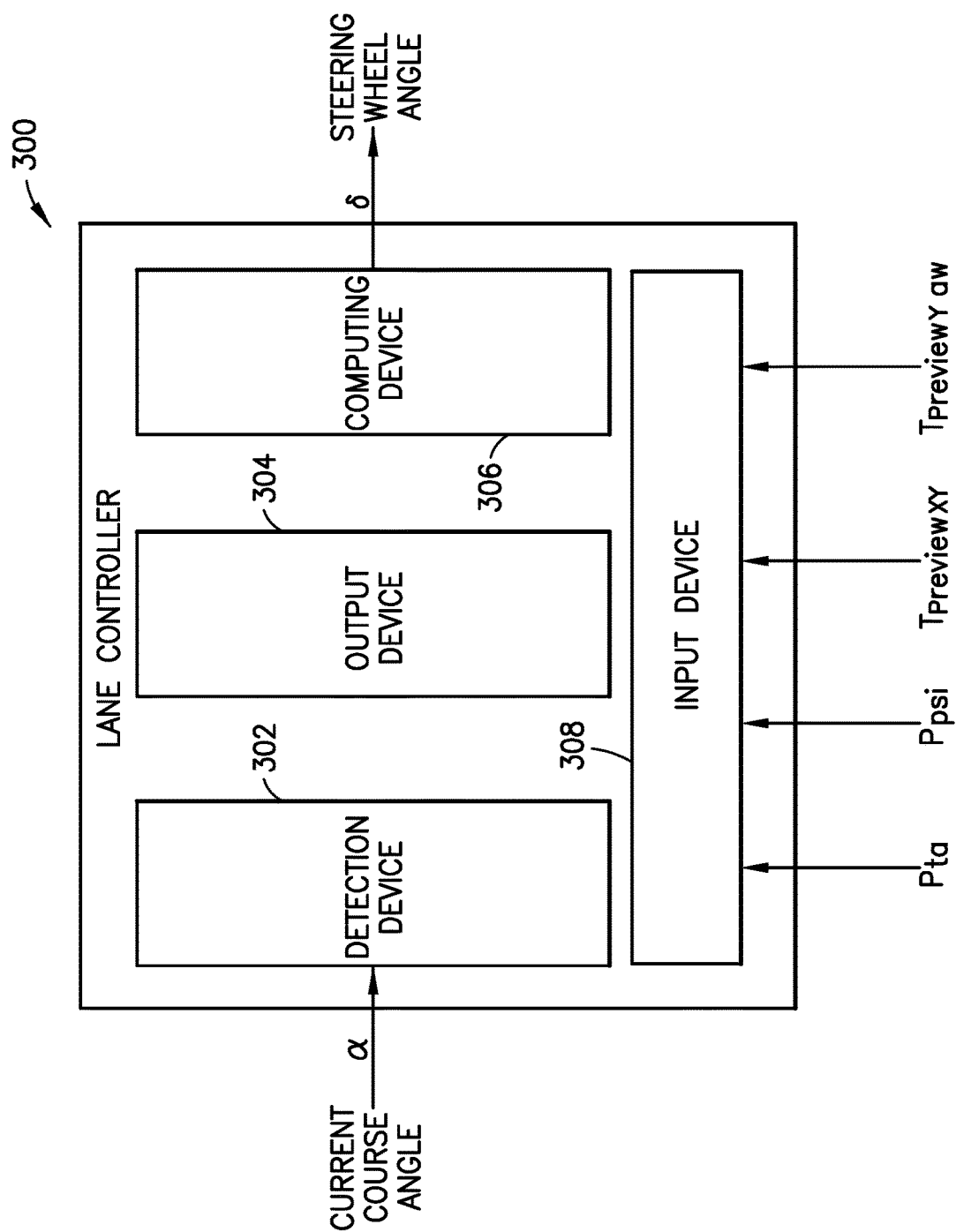
FIG. 3 is a diagrammatic illustration of a lane controller.

FIG. 3 diagrammatically illustrates a lane controller 300. The elements shown in FIG. 3 and described elsewhere in this disclosure may be implemented in various forms of hardware, software or combinations thereof. Preferably, these elements are implemented in a combination of hardware and software on one or more appropriately programmed general-purpose devices that may include a processor, memory and input/output interfaces. The term "connected" as used herein and implied by FIG. 3 is defined to mean directly connected to or indirectly connected through one or more intermediate components. Such intermediate components may include both hardware and software-based components.

It will be appreciated by those skilled in the art that the block diagrams presented herein represent conceptual views of illustrative circuitry, hardware and software embodying the principles of the disclosure. Similarly, any functions or methods implied by these block diagrams may be represented in computer readable media and so executed by a computer or processor, whether or not such computer or processor is explicitly shown. The lane controller 300 comprises a detection device 302 that is configured to detect or to determine a current course angle α. The detection device 302 may comprise sensors incorporated into the vehicle for sensing the steering wheel angular alignment, the alignment of the second wheel 108 as well as cameras or positioning devices incorporated into the vehicle.

The lane controller 300 of FIG. 3 comprises an output device 304 that is designed to output the steering wheel angle δ. The output device may include a dashboard display and/or communication hardware and/or communication software. The lane controller 300 also comprises a computing device 306 that may communicate with the output device and is configured to determine the steering wheel angle δ in accordance with the current course angle α of the first preview time $T_{PreviewXY}$ the first P component $P_{ta}$, the second preview time $T_{PreviewYaw}$ and the second P component $P_{psi}$. As noted above, the computing device 306 may be implemented as a combination of hardware and software on one or more appropriately programmed general-purpose devices that may include a processor, memory and input/output interfaces.

The computing device 306 that is configured to determine the steering wheel angle δ in accordance with the current course angle α of the first preview time $T_{PreviewXY}$ the first P component $P_{ta}$, the second preview time $T_{PreviewYaw}$ and the second P component $P_{psi}$ will be described below for the location 116 on the desired driving line 110, onto which the perpendicular through the center of gravity 112 falls. In the illustrated and/or described example, the location 116 is assigned an instantaneous position of the vehicle that is controlled by the lane controller 300.

The computing device 306 is configured to define, for the location 116, the desired course angle $\alpha_{psi}$ that is assigned to the first point 120. The first point 120 is arranged on a temporal profile of the desired driving line 110 at a distance of the first preview time $T_{PreviewYaw}$ from the location 116.

The computing device 306 is configured to determine the course angle deviation $\alpha_{psi}-\alpha$ of the current course angle $\alpha$ from the desired course angle $\alpha_{psi}$.

The computing device 306 also is configured to define the target angle $\alpha_{ta}$ for the second point 124. On the temporal profile of the desired driving line 110, the second point 124 is arranged at a distance of the second preview time $T_{PreviewXY}$ from the location 116 on the desired driving line. The computing device 306 is configured to determine, as the target angle $\alpha_{ta}$, an angle that the viewing direction 128 and the vehicle longitudinal axis 106 enclose for the points.

The computing device 306 is configured to determine the steering wheel angle $\delta$ in accordance with a sum total of the target angle $\alpha_{ta}$ reinforced with the first parameter $P_{ta}$ and of the course angle deviation $\alpha_{psi}-\alpha$ reinforced with a second parameter $P_{psi}$.

In addition, the lane controller 300 can comprise an input device 308 for inputting the first P component $P_{ta}$ and the second P component $P_{psi}$ and/or the first preview time $T_{PreviewYaw}$ and/or the second preview time $T_{PreviewXY}$. The input device 308 may comprise appropriate known hardware, wired or wireless interconnections or interfaces and/or appropriate software. As a result, the lane controller 300 is adjustable in a particularly simple manner.

The lane controller 300 also can carry out, for example, the method described below with reference to FIG. 4.

Figure 4:
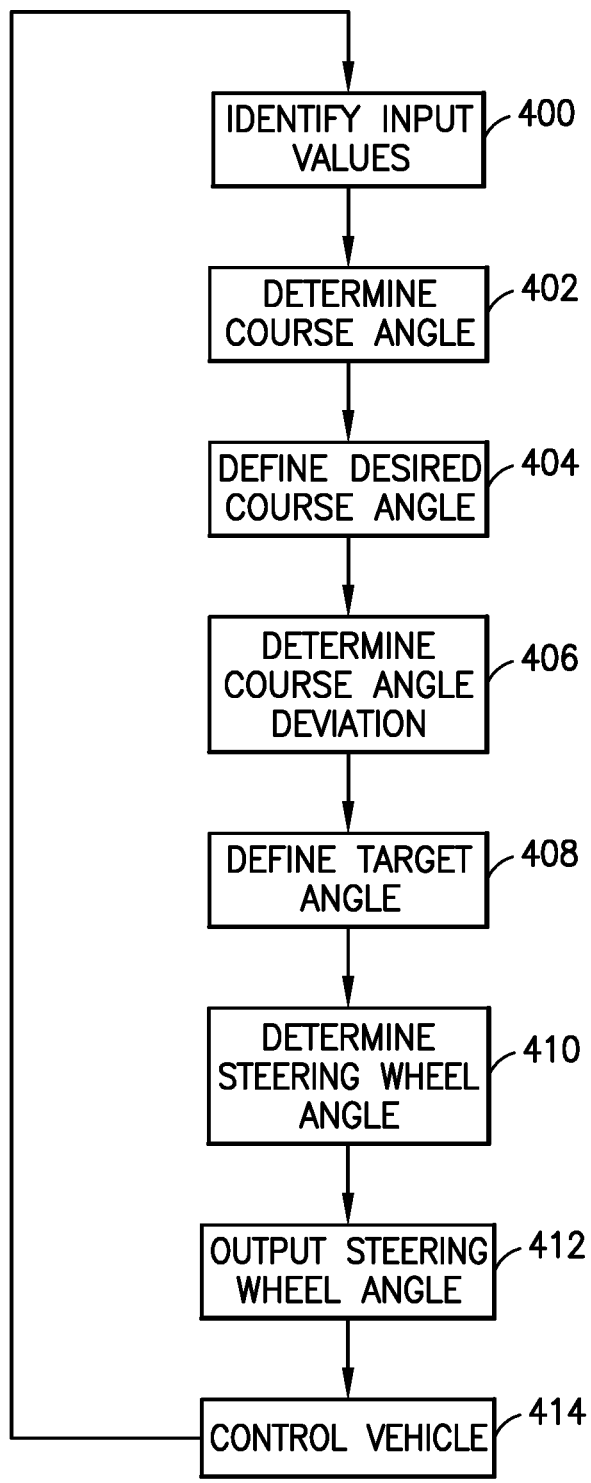
FIG. 4 is a flow chart that shows the steps of a method in accordance with one embodiment of the invention.

In a parameterizing operation, an optional step 400 can be provided for the method shown in FIG. 4. In the step 400, for example for parameterizing the lane controller 300, an input is identified defining values for the first parameter $P_{ta}$, the second parameter $P_{psi}$, the first preview time $T_{PreviewYaw}$ and/or the second preview time $T_{PreviewXY}$.

In this case, the first parameter $P_{ta}$ and/or the second parameter $P_{psi}$ and/or the first preview time $T_{PreviewYaw}$ and/or the second preview time $T_{PreviewXY}$ can be determined in accordance with the input.

As a result, the lane controller 300 can be parameterized in a simple manner.

Step 402 includes determining a current course angle $\alpha$ of the vehicle at the location 116 and assigning the current course angle $\alpha$ to the instantaneous vehicle position. The current course angle $\alpha$ can be measured or calculated from measured signals.

Step 404 includes defining the first preview time $T_{PreviewYaw}$ and determining the first point 120 on the desired driving line 110. The first point 120 is arranged on the desired driving line 110 at a distance of the first preview time $T_{PreviewYaw}$ from the location 116.

Step 404 includes defining the second preview time $T_{PreviewXY}$ and determining the second point 124 on the desired driving line 110. The second point 124 is at a distance of the second preview time $T_{PreviewXY}$ from the location 116.

Step 404 includes defining the desired course angle $\alpha_{psi}$ that is assigned to the first point 120.

Step 406 includes determining a course angle deviation $\alpha_7-\alpha$ of the current course angle $\alpha$ from the desired course angle $\alpha_{psi}$.

Step 408 includes defining a target angle $\alpha_{ta}$ that is assigned to the second point 124. The illustrated and described example includes determining the viewing direction 128 from the center of gravity 112 of the vehicle in accordance with the single track model 102 to the second point 124. However, the method can include determining a direction to the second point 124 starting from any other point with a fixed geometrical reference with respect to the vehicle. Examples of other points are a front axle center point of the vehicle or a driver's position in accordance with the model 102 of the vehicle. The target angle $\alpha_{ta}$ is determined in accordance with the angle by which the viewing direction 128 deviates from an orientation of the vehicle longitudinal axis 106 at the location 116 in accordance with the single track model 102 of the vehicle.

Step 410 includes determining the steering wheel angle $\delta$. The steering wheel angle $\delta$ is determined in accordance with a sum total of the target angle $\alpha_{ta}$ reinforced with a first parameter $P_t$, and of the course angle deviation $\alpha_{psi}-\alpha$ reinforced with a second parameter $P_{psi}$.

The steering wheel angle $\delta$ is output in a subsequent step 412. The vehicle subsequently is controlled, in a step 414, with the steering wheel angle $\delta$.

Subsequently, for example in the event of the parameterization process, the step 402 or otherwise the step 404 is carried out. The method ends, for example, when the lane control is ended.

What is claimed is:

1. An apparatus (300) for controlling the lateral dynamics of a vehicle, the apparatus (300) comprising: a detection device (302), an output device (304) and a computing device (306), the detection device (302) being configured to detect or to determine a current course angle ($\alpha$) of the vehicle, the output device (304) being configured to output a steering wheel angle ($\delta$) with which the vehicle is controllable, and the computing device (306) being configured to define a desired course angle ($\alpha_{psi}$) that is assigned to a first point (120) on a temporal profile of a desired driving line (110), the first point (120) being arranged on the desired driving line (110) at a distance of a first preview time ($T_{PreviewYaw}$) from a location (116) assigned to an instantaneous vehicle position, and the computing device (306) being configured to determine a course angle deviation ($\alpha_{psi}-\alpha$) of the current course angle ($\alpha$) from the desired course angle ($\alpha_{psi}$) and to define a target angle ($\alpha_{ta}$) that is assigned to a second point (124) on the temporal profile of the desired driving line (110), the second point (124) being arranged on the desired driving line (110) at a distance of a second preview time ($T_{PreviewXY}$) from the location (116), and the computing device (306) being configured to determine the steering wheel angle ($\delta$) in accordance with a sum total of the target angle ($\alpha_{ta}$) amplified by a first parameter ($P_{ta}$) and of the course angle deviation ($\alpha_{psi}-a$) amplified by a second parameter ($P_{psi}$), the first parameter and the second parameter being known information pertaining to vehicle performance.

2. The apparatus (300) of claim 1, wherein the computing device (306) is configured to define the first preview time ($T_{PreviewYaw}$) and to determine the first point (120) on the desired driving line (110), the first point being at a distance of the first preview time ($T_{PreviewYaw}$) from the location (116) and to define the second preview time ($T_{PreviewXY}$), and to determine the second point (120) on the desired driving line (110), the second point being at a distance of the second preview time ($T_{PreviewXY}$) from the location (116).

3. The apparatus (300) of claim 2, wherein the computing device (306) is configured to determine a direction (128) from a point with a fixed geometrical reference with respect to the vehicle, in particular from a center of gravity (112) or front axle center point of the vehicle in accordance with a model (102) of the vehicle or from a driver's position to the second point (124), and to determine the target angle ($\alpha_{ta}$) in accordance with an angle by which the direction (128) deviates from a vehicle longitudinal axis (106) in accordance with the model (102) of the vehicle.

4. The apparatus (300) of claim 1, further comprising an input device (308) for inputting the first parameter ($P_{ta}$) and/or the second parameter ($P_{psi}$) and/or the first preview time ($T_{PreviewYaw}$) and/or the second preview time ($T_{PreviewXY}$).

5. A method for controlling lateral dynamics, of a vehicle, the method comprising:
   detecting a current course angle ($\alpha$) of the vehicle;
   defining a desired course angle ($\alpha_{psi}$) that is assigned to a first point (120) on a temporal profile of a desired driving line (110), the first point (120) being on the desired driving line (110) at a distance of a first preview time ($T_{PreviewYaw}$) from a location (116) assigned to an instantaneous vehicle position;
   determining a course angle deviation ($\alpha_{psi}-\alpha$) of the current course angle ($\alpha$) from the desired course angle ($\alpha_{psi}$);
   defining a target angle ($\alpha_{ta}$) assigned to a second point (124) on the temporal profile of the desired driving line (110), the second point (124) being arranged on the desired driving line at a distance of a second preview time ($T_{PreviewXY}$) from the location (116);
   determining a steering wheel angle ($\delta$) in accordance with a sum total of the target value ($\alpha_{ta}$) amplified by a first parameter ($P_{ta}$) and of the course angle deviation ($\alpha_{psi}-\alpha$) amplified by a second parameter ($P_{psi}$), the first parameter and the second parameter being known information pertaining to vehicle performance; and
   outputting the steering wheel angle ($\delta$).

6. The method of claim 5, further comprising:
   defining the first preview time ($T_{PreviewYaw}$);
   determining the first point (120) on the desired driving line (110), the first point (120) being at a distance of the first preview time ($T_{PreviewYaw}$) from the location (116);
   defining the second preview time ($T_{PreviewXY}$); and
   determining the second point (124) on the desired driving line (110), the second point being at a distance of the second preview time ($T_{PreviewXY}$) from the location (116).

7. The method of claim 6, further comprising: determining a direction (128) from a point with a fixed geometrical reference with respect to the vehicle in accordance with a model (102) of the vehicle or from a driver's position to the second point (124); and
   determining the target angle ($\alpha_{ta}$) in accordance with an angle by which the direction (128) deviates from a vehicle longitudinal axis (106) in accordance with the model (102) of the vehicle.

8. The method of claim 5, further comprising identifying an input, and determining the first parameter ($P_{ta}$) and/or the second parameter ($P_{psi}$) and/or the first preview time ($T_{PreviewYaw}$) and/or the second preview time ($T_{PreviewXY}$) in accordance with the input.

* * * * *